United States Patent [19]
Cluth

[11] Patent Number: 5,884,930
[45] Date of Patent: Mar. 23, 1999

[54] DUAL RECEIVER HITCH WITH TOP WINCH PLATE

[76] Inventor: Wayne R. Cluth, P.O. Drawer 471177, Lake Monroe, Fla. 32747-1177

[21] Appl. No.: 739,128

[22] Filed: Oct. 28, 1996

[51] Int. Cl.[6] .................................................. B60D 1/52
[52] U.S. Cl. ......................... 280/497; 224/564; 224/519; 224/528
[58] Field of Search .............. 280/491.1, 491.5, 280/504, 461.1, 415.1, 416.1, 497, 495; 224/564, 565, 511, 512, 545, 546, 547, 555, 488, 489, 509, 518, 519, 521, 520, 524, 528

[56] References Cited

U.S. PATENT DOCUMENTS

| | | | |
|---|---|---|---|
| 4,046,398 | 9/1977 | Dunwoody | 280/415.1 |
| 4,380,344 | 4/1983 | Abbott | 224/519 |
| 4,381,069 | 4/1983 | Kreck | 224/521 |
| 5,267,748 | 12/1993 | Curran | 280/415.1 |
| 5,397,147 | 3/1995 | Ducharme et al. | 280/415.1 |
| 5,707,072 | 1/1998 | Hopper | 280/491.5 |

*Primary Examiner*—Kevin Hurley

[57] ABSTRACT

A welded, steel apparatus consisting of multiple receiver tubes (A) reinforced by collars (B) separated and attached to the spacer bar (C), with a mounting tube (D) which can be inserted into a slide-in type vehicle receiver hitch. Into which is inserted the assembly consisting of the deck plate (E), mounted to and supported by bar (F), reinforced by gusset (G), attached to and spaced from the mounting tube (I) by the riser bar (H). Thus permitting the use of multiple trailer hitch accessories at the same time; including the attachment of a portable hand crank or powered winch unit.

4 Claims, 6 Drawing Sheets

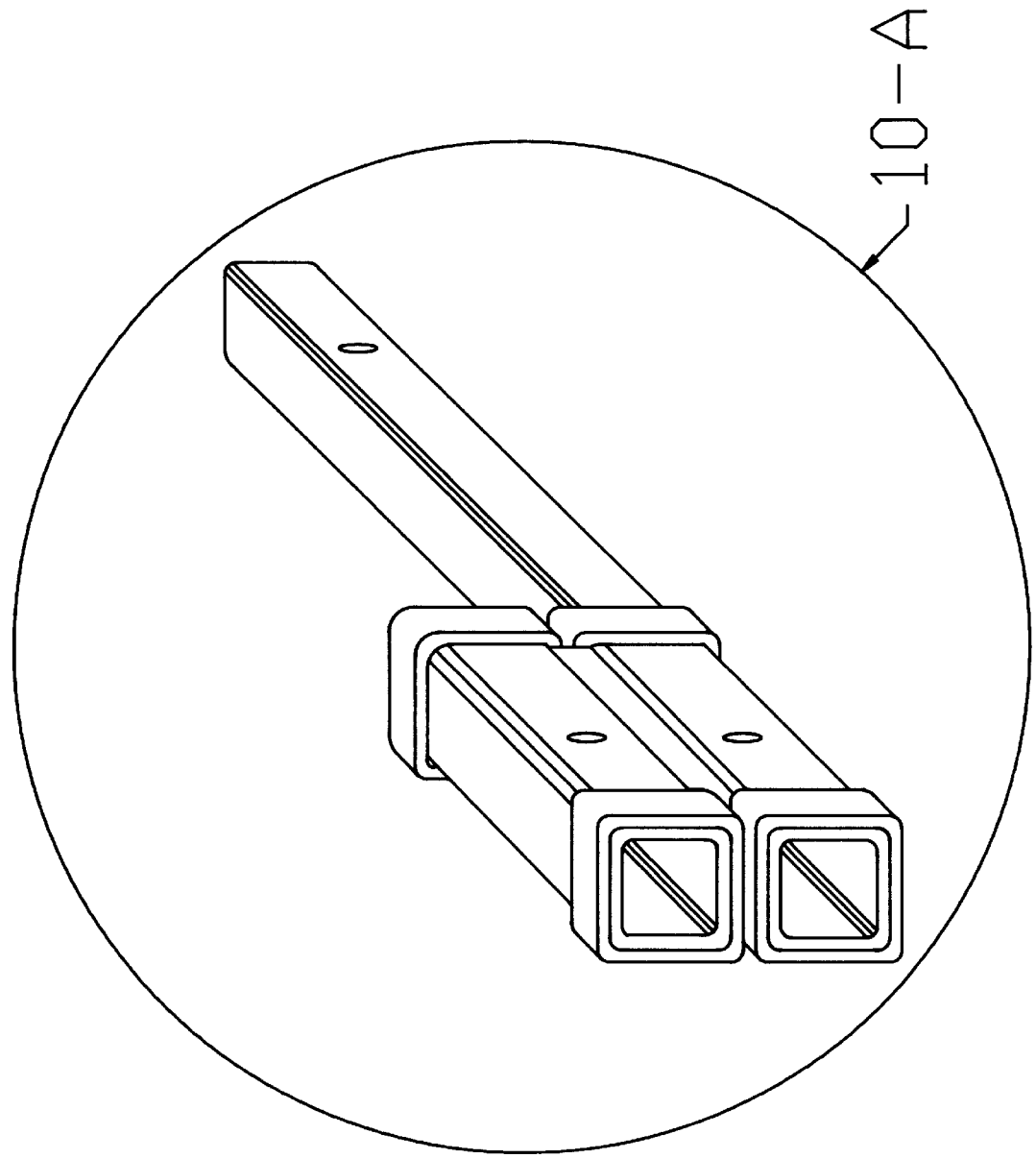

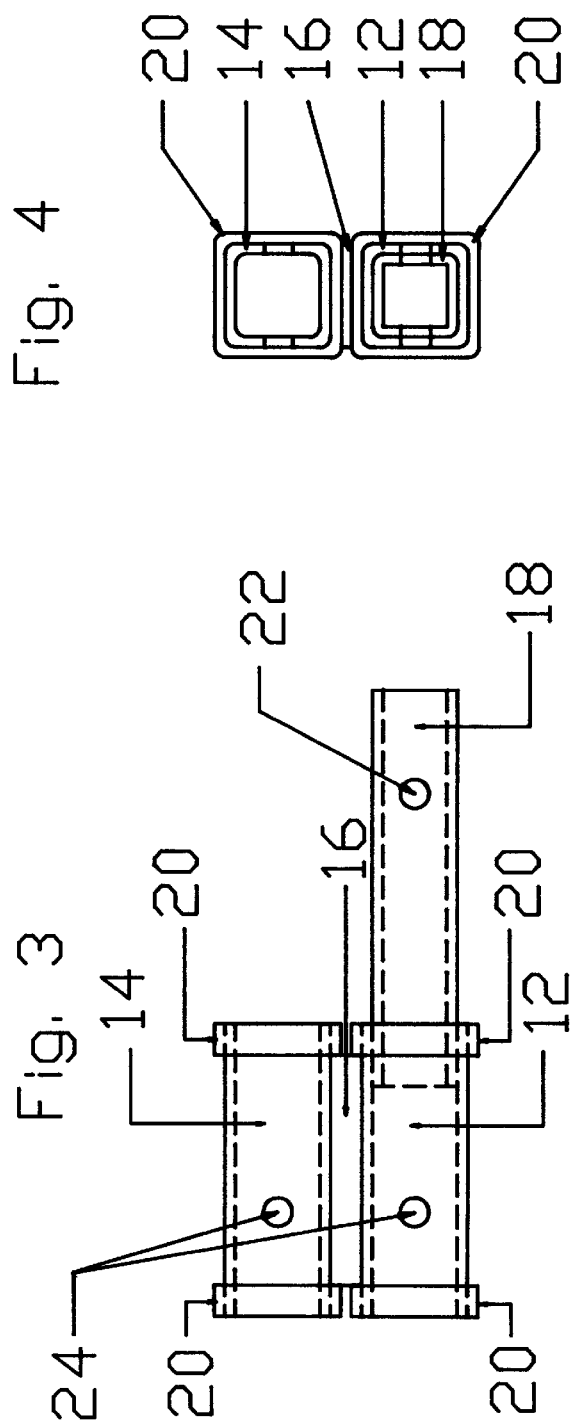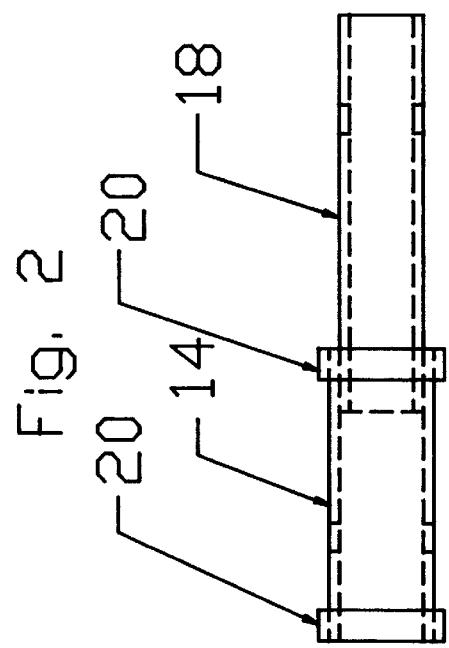

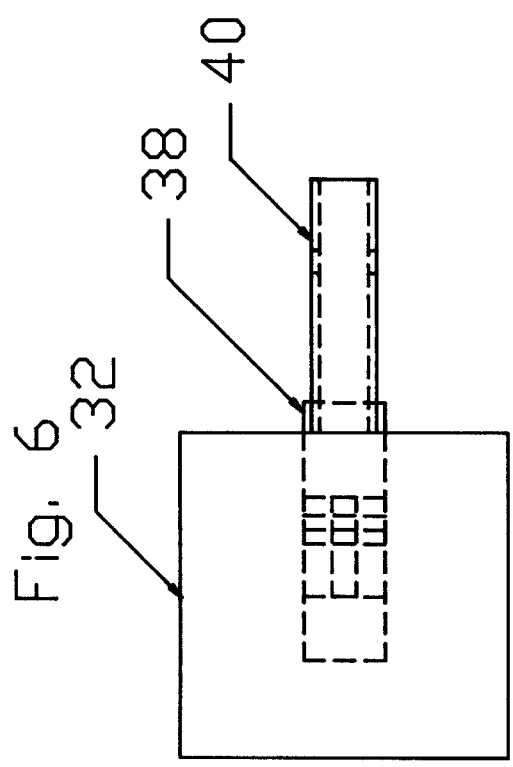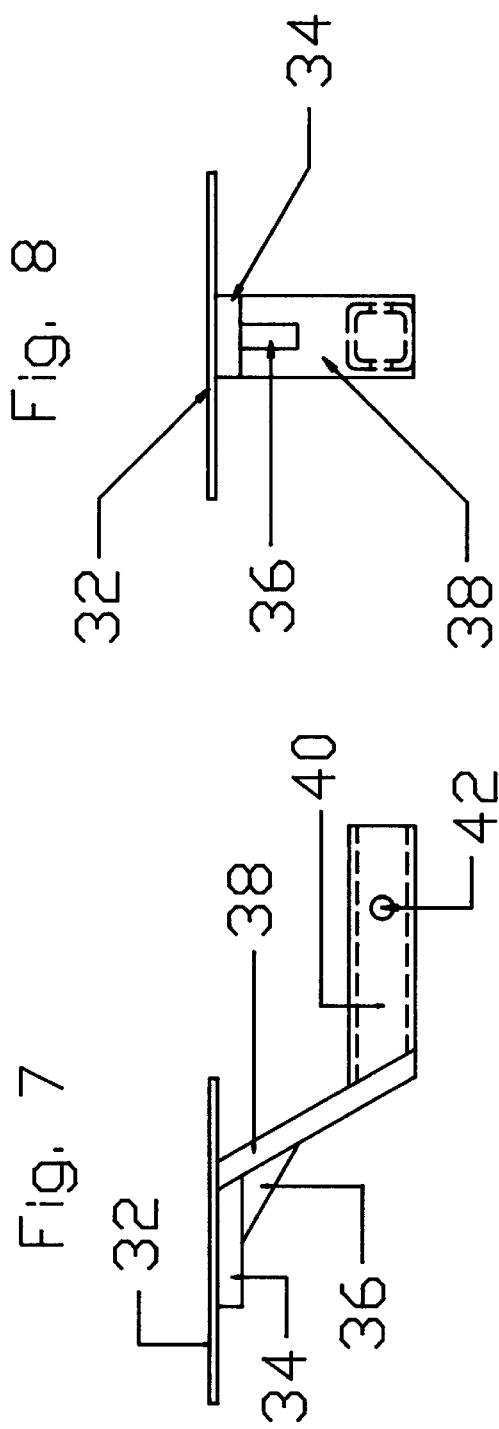

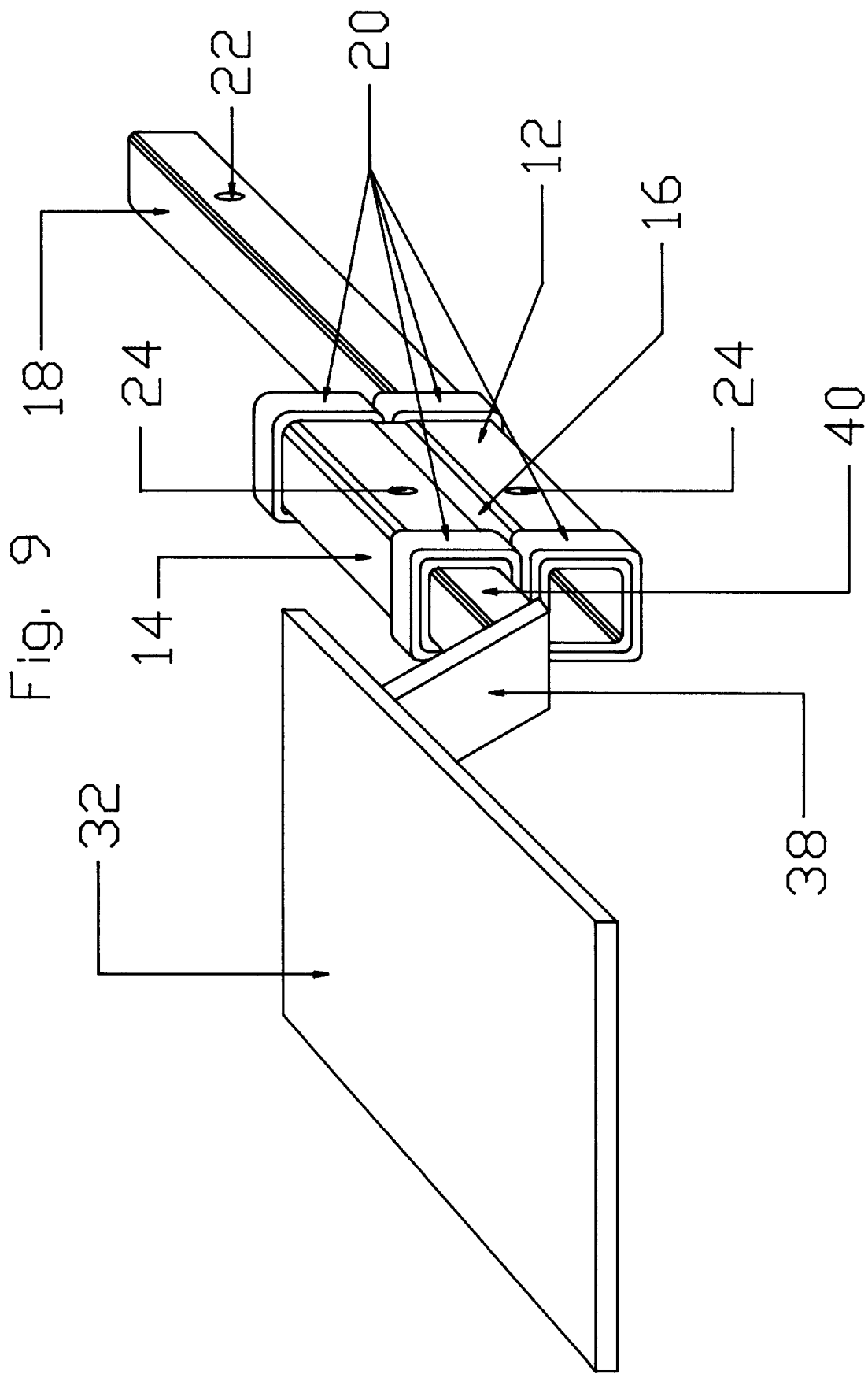

DUAL RECEIVER HITCH WITH TOP WINCH PLATE

BACKGROUND

1. Field of Invention

This invention relates to motorized vehicles using a frame or similarly mounted, receiver type hitch; specifically used when towing a trailer and also needing the receiver portion of the hitch assembly to perform an additional function such as pulling a heavy load onto the trailer at the same time.

2. Description of Prior Art

Many automotive vehicles sold are offered with a towing package which includes a frame mounted hitch receiver consisting of an assembly whereby the trailer ball used to attach the towed unit to the towing vehicle is mounted on a separate slide-in tongue affixed with a pin. While not restricted to new sales of automotive vehicles, this type of hitch receiver has also been used on older cars, trucks, tractors, and other types of motorized vehicles to pull heavy loads, a trailer or camper, and more recently to attach accessory items such as bike racks, ski racks, and trailer decks.

Whereas, the automotive winch industry has somewhat limited their field with the winch assembly to: a rigidly attached, front or rear mounted unit, affixed to the bumper or frame; the boating or marine industry uses a winch, either band crank or powered, normally attached to the front trailer extension.

In each application, the trailer ball tongue or the winch can only be used in a single application at any one time: i.e. if the receiver hitch is used for a bike rack attachment, it can not be used to tow a trailer; and if the winch is mounted to a boat trailer, it can not be used to pull a car on a car trailer or switched to another vehicle.

Typical attachment of hitch accessory is by means of a hitch pin inserted through the holes of the accessory and the hitch and retained by a spring clip. Unless a locking type hitch pin is used to attach any of the trailer hitch accessory items or the trailer ball tongue to the receiver; or the winch is permanently attached to the vehicle or trailer by a method such as welding or one-way bolts; all are subject to potential theft. Even the locking type pins can be cut off with a torch if the thief is desperate enough to steal a particular item. In any case, the theft of automotive and marine accessories constitutes a large economic loss to the public.

The closest item, incorporating the concept of making the winch removal, to this invention, is a powered winch, mounted to a notched plate which slips over the trailer hitch ball. This makes the winch removable, but restricts its use and limits the use of the hitch, to using only the winch, there is no provision for trailing or other accessories to be attached at the same time.

This invention reduces the potential for theft of attached accessories because it is easily removed and allows the end user to utilize the trailer hitch for multiple purposes, including, but not limited to: a removable winch for pulling out their own vehicle when stuck or pulling items on trailers.

Objects and Advantages

With the dual receiver hitch with top winch plate, the consumer is able to gain multiple uses from the trailer hitch receiver at the same time and is able to remove the attachments for safe storage in a truck, cab, or other area of safe keeping, as well as use the same items on multiple vehicles, specifically it can be used to:

(a) provide a means to pull a trailer or camper and attach a bike or ski rack to the hitch receiver;

(b) provide for a means for the accessories such as the bike and ski racks to be interchanged without unhooking the trailer;

(c) provide a way to use a winch on any car, truck or tractor with a slide-in type receiver without permanent attachment to the vehicle; whereas the winch can now be used to pull a car, boat, tractor, anything that may need to be moved on a trailer or just pulled, such as a stuck vehicle;

(d) assist senior citizens or physically restricted people, by providing a means to lift a boat trailer tongue or any other such item onto the trailer ball or in pulling it to the towing vehicle by installing a lift or pull ring on the towed item;

(e) provide a benefit to public safety organizations, no longer requiring a dedicated vehicle set up to pull a rescue boat or other life saving equipment; because trailer and winch can be switched from vehicle to vehicle as needed, without the additional expense of individual units or vehicles being set up to handle a winch and/or a trailer;

(f) provide a reduction in the theft of items such as boat winches, accessory racks, etc., because they can be easily removed for safe storage;

(g) provides an individual the opportunity, to remove a stranded vehicle from the side of the road by being able to pull the disabled vehicle onto a auto-trailer without the need of gathering several people needed to push the vehicle up the ramps;

(h) permits the average person to remove a winch from the trunk of their car and pull themselves out of snow or mud without having to abandon the vehicle to get another tow vehicle thus reducing potential theft of the abandoned vehicle or creating additional safety hazards;

(i) provide a hunter or sportsman the means of safely lifting a "prize kill" onto a trailer by using a winch cable over a tree limb, etc, and lowering his "trophy" onto a trailer for transport (j) provide an accessory, in the form of, but not limited to, a winch, mounted to the plate that can be used on other motorized units such as farm tractors, lawn and garden tractors, or any other similar equipment where a slide-in hitch receiver tube can be mounted; the top winch plate can be used to mount a variety of items, small compressors, welders, winches, or any other item that may be conveyed by a vehicle and/or may require attachment to different vehicles;

(k) allow a winch to be removed in inclement weather, providing additional years of service yet be handy enough to be used on a regular basis, and (l) when used in conjunction with a front mounted receiver tube, such as can be found on some vehicles with front step bumpers or grille protector bars (safari or bush bars), the winch can now be transferred from rear to front for additional pulling options.

There are potentially many other uses that can be found for the dual receiver hitch with top winch plate that have yet to be considered and tried, but the advantages listed above make this item a considerable asset to the consumer that uses his/her vehicle for business, recreation, public safety, etc. A working unit has been fabricated and tested in actual operation.

DESCRIPTION OF DRAWINGS

FIG. 1: Item #10-A—an isometric view of the Dual Receiver Assembly

FIG. 2: Overhead, Plane view of Dual Receiver Assembly

FIG. 3: Lateral, Plane View of Dual Receiver Assembly

FIG. 4: End, Plane view of Dual Receiver Assembly

FIG. 6: Overhead, Plane view of the Winch Plate Assembly

FIG. 7: Lateral, Plane view of the Winch Plate Assembly

FIG. 8: End, Plane view of the Winch Plate Assembly

FIG. 9: Composite drawing of the Dual Receiver Assembly and Winch Plate Assembly as it would be assembled for use.

DESCRIPTION OF INVENTION

Figure 5:
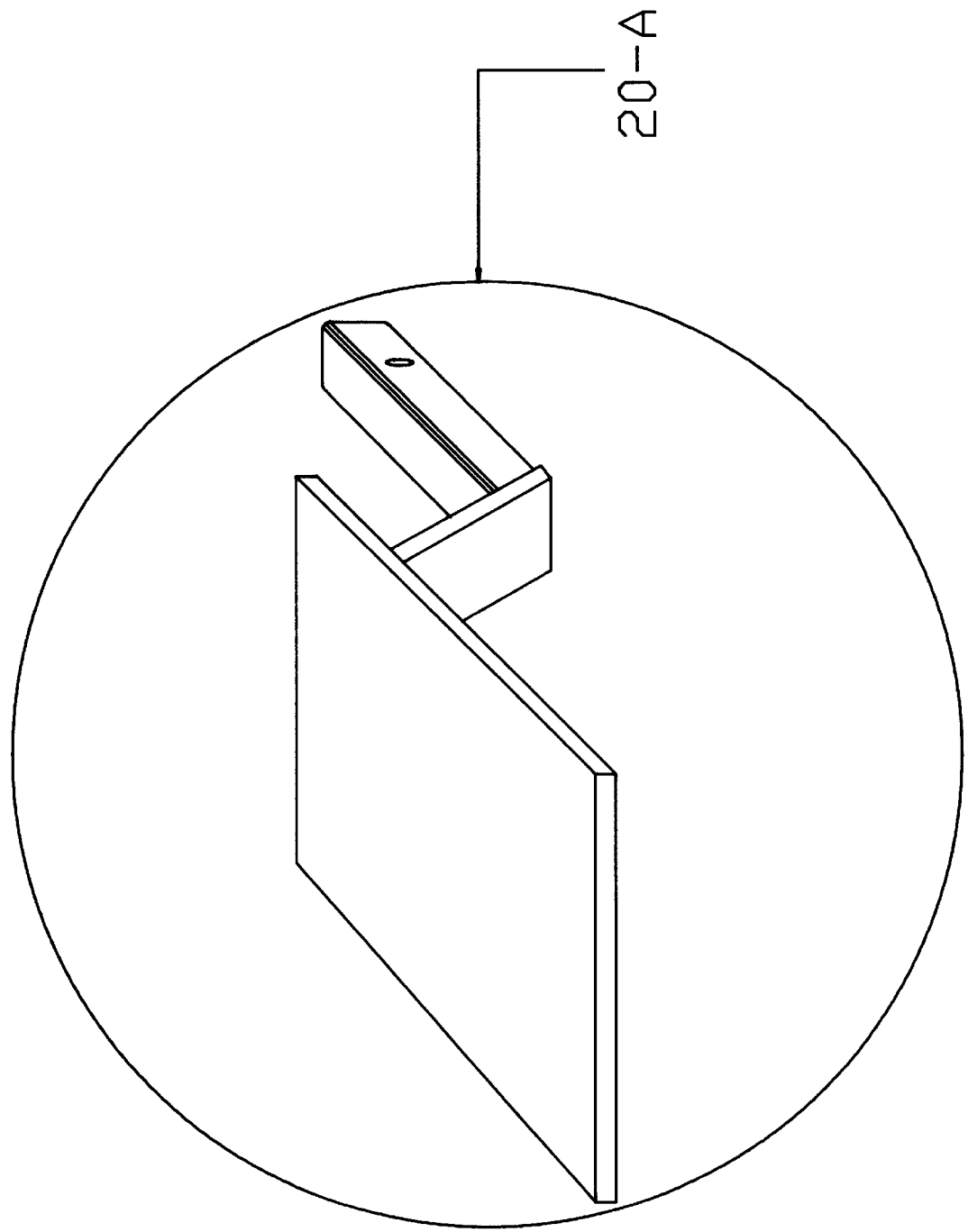
FIG. 5: Item #30-A—an isometric view of the Winch Plate Assembly
Figure 10:
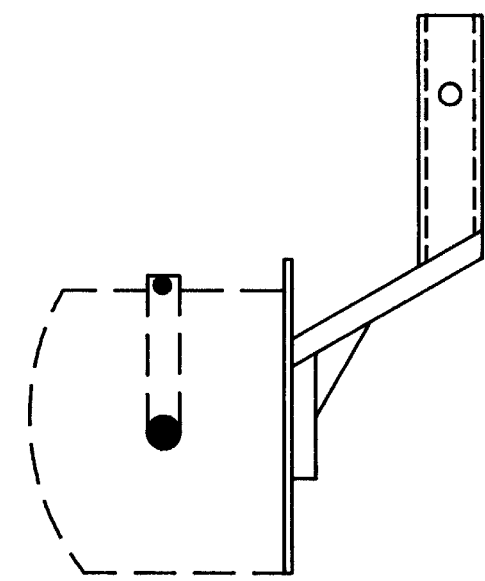
FIG. 10: Lateral, Plane view of the Winch Plate Assembly with an optional accessory mounted—i.e. primary application of invention
Figure 11:
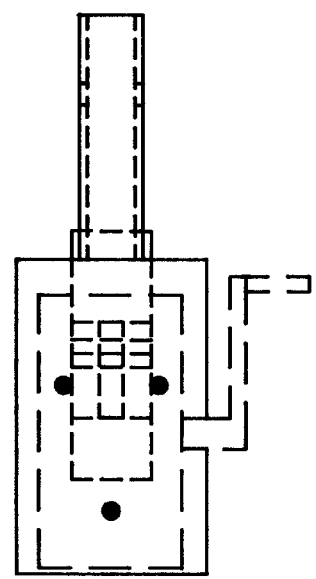
FIG. 11: Overhead, Plane view of the Winch Plate Assembly with an optional accessory mounted—i.e. primary application of invention

Item #10-A—the Dual Receiver Assembly, shown in FIG. 1; is comprised of: as illustrated in FIGS. 2, 3 and 4: a Primary Receiver Tube, Item #12; separated from the Secondary Receiver Tube. Item #14; by a Spacer Block, Item #16; of a distance permitting the attachment of the Reinforcement Collars, Items #20; at each end of the Primary Receiver Tube, Item #12; and the Secondary Receiver Tube. Item #14. The Reinforcement Collars, Item #20; are required to reduce the potential "can opener" effect or splitting of the corner metal by up and down ratching motion, at the front and rear end of each the tubes as optional items may be inserted or used in one or both of the receiver tubes, Items #12 and #14. Into the rear of the Primary Receiver Tube, Item #12; is welded the Dual Receiver Mounting Tube, Item #18; which is inserted into the square tube receiver of a platform trailer hitch affixed to a motor vehicle; i.e. car, truck, farm tractor, ATV, motor home, etc. and attached to the vehicle platform trailer hitch by means of inserting a hitch pin completely through the vehicle platform hitch, and passing through the Dual Receiver Hitch Pin Attaching Hole, Item #22. Dependent on which way the Dual Receiver Assembly is attached to the vehicle, i.e. the Secondary Receiver Tube is higher or lower than the Primary Receiver Tube, allows for a variance in the draw bar tongue and ball of a trailer hitch to be raised or lowered as needed for proper, level towing. The draw bar tongue and ball is then attached, by means of a hitch pin inserted through the Accessory Hitch Pin Attaching Hole Item #24; in the lower of the two receiver tubes, permitting the Winch Plate Assembly, Item #30-A; illustrated in FIG. 5, to be inserted in the upper tube. The Winch Plate Assembly, Item #30-A; is comprised of: as illustrated in FIGS. 6, 7, and 8; a Winch Plate Mounting Tube, Item #40; used to attach the Winch Plate Assembly to the Dual Receiver Assembly, Item #10-A; by means of a hitch pin inserted completely through the Accessory Hitch Pin Attaching Hole, Item #24; of the Dual Receiver Assembly and through the Winch Plate Pin Attaching Hole, Item #42; of the Winch Plate Assembly. To the mounting tube is affixed a Riser Bar, Item #38; which is welded to the end of the tube extending at an upward angle for a determined height, as needed to permit a trailer coupler to be attached or removed from the draw bar tongue and ball without removal of the Winch Plate Assembly, Item #30-A. To the Riser Bar, Item #38; is attached the Deck Plate, Item #32; parallel to the Mounting Tube, Item #40; and reinforced by means of a Support Bar, Item #34; and a Knee Brace or Gusset, Item #36. The items, #34 and #36; are necessary due to the lateral force generated when pulling an object with a crank or power winch such as illustrated in FIG. 10, which shows an optional powered winch mounted to the Winch Plate Assembly, Item #30-A All Items are attached by weldment for strength.

Operation

The operational use of the dual receiver hitch with top winch plate consists of inserting the mounting tube of the dual receiver hitch into the vehicle slide-in receiver hitch until the hitch pin can be inserted through the holes in each. The top winch plate (with winch attached as illustrated on drawing Sheet 6 of 6) is then inserted into the upper receiver tube of the dual receiver hitch until the holes line up and the hitch pin inserted. The conventional trailer tongue with trailer ball can be placed in the lower receiver tube and when used in this fashion, the winch can be used to pull (or winch) items onto the trailer without undo effort and then be removed for safe storage or convenience without disturbing the trailer connections Dependent on the height needed for the trailer tongue and ball to maintain the level of the trailer, the dual receiver hitch can be rotated in it's under/over position to raise or lower the ball as needed without having to purchase additional trailer towing bars of varying drops.

Summary, Ramifications, and Scope

Thus the reader is able to see that the dual receiver hitch with top winch plate would be of benefit to many consumers in various fields of: work, recreation, and public safety. In the agricultural area, a farmer could use it on a tractor, truck, or other farm vehicle to assist with chores, equipment moving, taking items in for repair. In public safety, several vehicles could be used to pull a rescue boat or attach a life line instead of a designated vehicle set up for that particular purpose. Senior citizens can continue to enjoy their boats and campers long after their physical restrictions prevent them from lifting or pulling heavy trailers. The sportsman can use it for pulling boats, campers, off-road vehicles, whereas the hunter can easily lift his "trophy kill". The off-road vehicles enthusiast can use it to pull themselves out of the mud or even borrow a winch from another vehicle to get them unstuck. Whereas any user of these items can easily remove an expensive winch unit from their vehicle and safely store it out of the weather and away from potential thieves. The family with several conveyances can then use one winch on any number of vehicles.

Although the dual receiver hitch with top winch plate is sized (as in the dimensions given) for slide-in style, frame hitches presently available, it should not be construed to be limited in thus form restricting the variable in dimensions, thereby limiting the adaptability to future size requirements, nor in it's uses, limited to those previously mentioned. A trailer hitch is no longer restricted to the single function of pulling a trailer

What is claimed is:

1. A dual receiver assembly for a vehicle comprising:

a primary receiver tube having a substantially rectangular cross section;

a mounting tube rigidly attached to a rear end of the primary receiver tube and being adapted to be removably received in a vehicle receiver tube;

a secondary receiver tube having a substantially rectangular cross section and being rigidly attached to the primary receiver tube;

said secondary receiver tube being mounted to the primary receiver tube so as to extend substantially parallel therewith.

2. The dual receiver assembly of claim 1 further comprising:

a plurality of apertures formed in the primary and secondary receiver tubes for receipt thereof of a locking pin.

3. The dual receiver assembly of claim 1 further comprising:

a plurality of apertures formed in the mounting tube for receipt thereof of a locking pin.

4. The dual receiver assembly of claim 1 further comprising:

a reinforcement collar being formed around each end of the primary and secondary receiver tubes.

* * * * *